United States Patent [19]

Ekberg

[11] Patent Number: 5,653,816
[45] Date of Patent: Aug. 5, 1997

[54] METHOD FOR CLEANING THE FILTER MEDIUM IN A SUCTION DRYER BY FOCUSING ULTRASONIC BEAMS

[75] Inventor: Bjarne Ekberg, Turku, Finland

[73] Assignee: Outokumpu Mintec Oy, Espoo, Finland

[21] Appl. No.: 423,741

[22] Filed: Apr. 17, 1995

[30] Foreign Application Priority Data

Apr. 19, 1994 [FI] Finland .................................. 941796

[51] Int. Cl.⁶ ..................................................... B08B 3/12
[52] U.S. Cl. ............................. 134/1; 134/184; 210/785; 310/335
[58] Field of Search ...................... 134/1, 184; 310/334, 310/335; 210/785

[56] References Cited

U.S. PATENT DOCUMENTS

| | | | |
|---|---|---|---|
| 3,192,418 | 6/1965 | Sansom | 310/335 |
| 3,451,260 | 6/1969 | Thurstone | 310/335 |
| 4,260,928 | 4/1981 | Salem | 310/335 |
| 4,444,146 | 4/1984 | De Witz et al. | 134/1 |
| 5,015,929 | 5/1991 | Cathignol et al. | 310/335 |
| 5,039,347 | 8/1991 | Hindstrom et al. | 134/1 |
| 5,111,805 | 5/1992 | Jaggy et al. | 310/335 |
| 5,477,736 | 12/1995 | Lorraine | 310/335 |

*Primary Examiner*—Jill Warden
*Assistant Examiner*—Saeed Chaudhry
*Attorney, Agent, or Firm*—Brooks Haidt Haffner & Delahunty

[57] ABSTRACT

The invention relates to a method for cleaning the filter medium in a suction dryer by means of ultrasound in an essentially continuous operation. According to the invention, the ultrasonic beams emitted from at least one ultrasonic oscillator (1, 12, 22, 36) are focused essentially near to the filter surface (4, 14, 25) of the filter medium, advantageously on the filter surface (4, 14, 25) of the filter medium, in order to create at least one ultrasound focusing zone.

4 Claims, 2 Drawing Sheets

METHOD FOR CLEANING THE FILTER MEDIUM IN A SUCTION DRYER BY FOCUSING ULTRASONIC BEAMS

The present invention relates to a method and apparatus for cleaning the filter medium of a suction dryer by means of ultrasound in an essentially continuous operation.

The FI patent 61,739 introduces a drying method and apparatus for drying web-like, pulverous, solid or porous material, in which method the material to be dried is put, by intermediation of a fine porous liquid suction surface, into hydraulic contact with a liquid maintained at an underpressure in relation to the material to be dried. The apparatus used in the said method comprises a fine porous liquid suction surface, where the radii of the fine pores are mainly within the range 0.5–2 micrometers.

The fine porous liquid suction surface forms the filter surface for the filter medium of the suction dryer, which filter surface is set into contact with the material to be dried, such as slurry. When the filter surface is for instance plane-like, and when there is created underpressure at the surface opposite to the filter surface of the filter medium, on the filter surface there is created, due to the suction, a cake filtered of the material to be dried, which cake is then scraped off the filter surface. However, the filter surface is susceptible to choking, because the pore structure of the filter surface of the filter medium, and thus also that of the filter medium itself, is gradually filled with finely divided material to be dried.

It is known in the prior art to use ultrasound in the cleaning of the filter surface of the filter medium of a suction dryer, as is described in the FI patent 76,705. In the method of this FI patent 76,705, the use of ultrasound requires that for the duration of ultrasonically boosted cleaning, the filter surface is set into contact with a connecting and cleaning liquid, such as water. In that case, when the filter surface is surrounded by water, the required ultrasound power is not very high, and the risk for corrosion owing to the cavitation is eliminated. However, the changing of the material surrounding the filter medium reduces the capacity available in the suction dryer, and thus increases the installation and running costs of the suction dryer.

From the FI patent 82,388, there is known a cleaning method for the filter medium of a suction dryer, in which method the cleaning with an ultrasonic oscillator takes place essentially immediately after scraping the filter medium. In this method of the FI patent 82,388, the ultrasonic oscillator is located in the basin of the slurry to be filtered, underneath the liquid surface, in order to carry out the cleaning of the filter medium in continuous operation. With a high solid content of the surrounding slurry, the required ultrasonic power rises high, too. Likewise, the surrounding slurry corrodes the shell of the ultrasonic oscillator due to intensive cavitation. An increase in the ultrasonic power and the changing of the oscillator shells increase the running costs of the suction dryer.

It is an object of the present invention to eliminate some of the drawbacks of the prior art and to achieve an improved cleaning method for the filter medium of a suction dryer, in which method the filter medium is cleaned by means of ultrasound in an apparatus which focuses the ultrasonic sound field to be narrow. The essential novel features of the invention are enlisted in the appended patent claims.

According to the invention, the cleaning of the filter medium of a suction dryer is carried out by means of an ultrasonic device which focuses the ultrasonic sound field to be so narrow that the ultrasonic field advantageously falls on the filter surface of the filter medium for an essentially short time, which is 10–150 milliseconds, advantageously 60–90 milliseconds. Now the energy frequency on the surface of the ultrasonic oscillator is low, and the ultrasonic oscillator can also be installed underneath the liquid surface of the slurry located in the basin of the structure and surrounding the ultrasonic oscillator. Owing to the low energy frequency on the surface of the ultrasonic oscillator, also the danger of corrosion in the oscillator shell is low. However, on the filter surface of the filter medium, the ultrasonic power is high owing to the focusing according to the invention, and the cleaning is carried out effectively. The invention can advantageously be applied both to a filter medium composed of filter elements and to a uniform filter medium covering essentially the whole filter surface of the suction dryer.

The focusing of ultrasound according to the invention to essentially near to the filter surface of the filter medium, advantageously on the filter surface of the filter medium, can be carried out by using one or several ultrasonic oscillators. When employing one ultrasonic oscillator in the method of the invention, the oscillating surface of the oscillator is essentially concave or convex. When the oscillating surface is concave, the oscillating surface itself advantageously serves as a reflector by focusing the ultrasound on a narrow area on the filter surface of the filter medium. When the oscillating surface is convex, ultrasound is conducted, via a concave reflector surface onto the filter surface of the filter medium.

When using at least two ultrasonic oscillators, the oscillators are advantageously arranged, with respect to each other, in a position where the beams coming from the ultrasonic oscillators intersect on the filter surface of the filter medium, or essentially near to the filter surface of the filter medium, so that the ultrasound emitted from the oscillators is focused on a small area on the filter surface of the filter medium. Now at least part of the ultrasonic oscillators have an advantageously planar oscillating surface. Furthermore, when using two or more ultrasonic oscillators, the oscillators can be installed at different lengths from the filter surface of the filter medium.

According to the invention, the focusing of ultrasonic beams created by two or more ultrasonic oscillators to essentially near to the filter surface of the filter medium, advantageously on the filter surface of the filter medium, can also be carried out so that for one and the same filter medium, there are created two or more separate narrow ultrasound focusing zones by employing two or more ultrasonic oscillators. The size of the ultrasound focusing zones is within the range 1–30 mm, advantageously 10–15 mm.

In the apparatus of the invention, in the vicinity of the filter surface of the filter medium, there are created, by means of at least one ultrasonic oscillator, an oscillating surface that focuses the ultrasonic beams onto the filter surface. The employed oscillating surface according to the invention can advantageously be convex or concave. The oscillating surface can also be composed of several essentially planar oscillating surfaces, which are advantageously installed tangentially with respect to the circumference of the same circle. When using a convex oscillating surface, the oscillator itself is advantageously rod-like in shape, but in this case the shape of the oscillator can also contain, in addition to a convex oscillating surface, planar elements on the same cross-sectional level.

BRIEF DESCRIPTION OF THE DRAWINGS

The invention is described in further detail below, with reference to the appended drawings, wherein.

Figure 1:
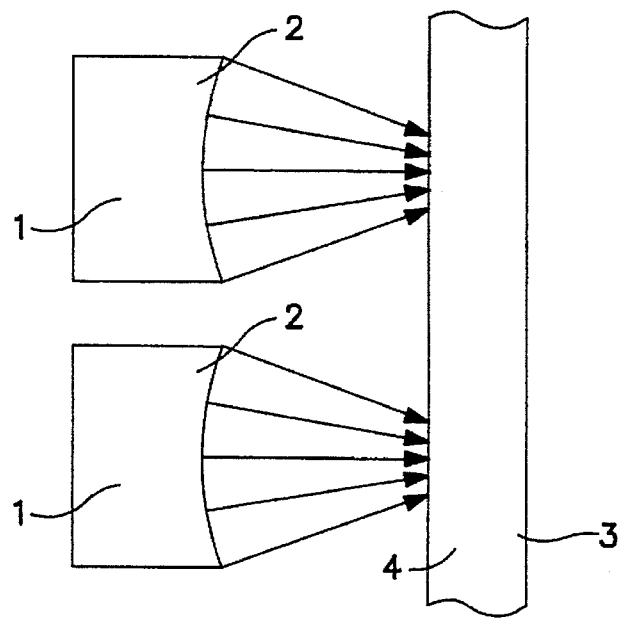
FIG. 1 is a schematic top-view illustration of a preferred embodiment of the invention.

According to FIG. 1, the oscillating surface 2 of the ultrasonic oscillator 1 is essentially concave in shape. With respect to the filter element 3 of the suction dryer, the oscillating surface 2 is installed in a position where the beams emitted from the oscillating surface 2 are directed to the filter surface 4 of the filter medium 3 so that the radiating effect of the beams is focused only on a limited area of the filter surface 4. According to FIG. 1, two separate ultrasound focusing zones are created on the filter surface 4.

Figure 2:
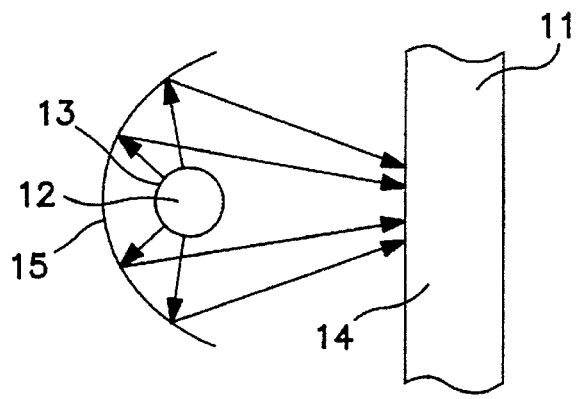
FIG. 2 is a schematic top-view illustration of another preferred embodiment of the invention.

In FIG. 2, in the ultrasonic cleaning of the filter medium 11 of a suction dryer there is used an ultrasonic oscillator 12, the oscillating surface 13 whereof is essentially convex in shape and which oscillator is located on the opposite side with respect to the filter element 11. In order to conduct ultrasonic beams onto the filter surface 14 of the filter medium 11, there is installed an essentially concave reflector surface 15 in the vicinity of the ultrasonic oscillator 12, but on the opposite side with respect to the filter element 11. The ultrasonic beams emitted from the oscillating surface 13 are reflected from the reflector surface 15 so that the ultrasonic beams are focused on an essentially narrow area of the filter surface 14 of the filter medium.

Figure 3:
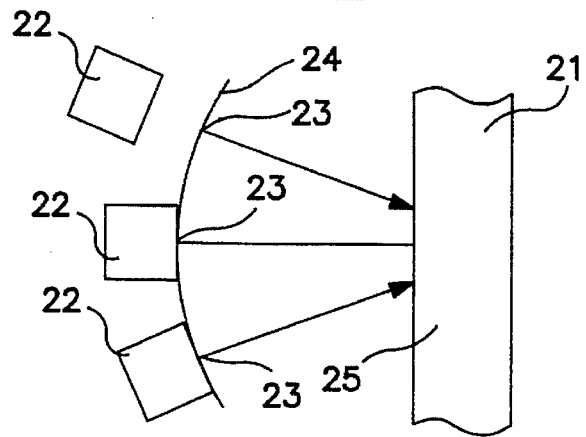
FIG. 3 is a schematic top-view illustration of a third preferred embodiment of the invention.

In FIG. 3, in the vicinity of the filter medium 21 a the suction dryer, there are installed ultrasonic oscillators 22 so that the oscillating surfaces 23 of the ultrasonic oscillators at least tangentially touch the circumference 24 of one and the same circle. Even in shape, the oscillating surface 23 can be essentially similar to the circumference 24 of a circle. Now the ultrasonic beams emitted from the ultrasonic oscillators 22 advantageously intersect on the filter surface 25 of the filter medium 21, or essentially in the immediate vicinity of the filter surface 25. Thus the ultrasonic power coming from the ultrasonic oscillators 22 can be focused on an essentially small area.

Figure 4:
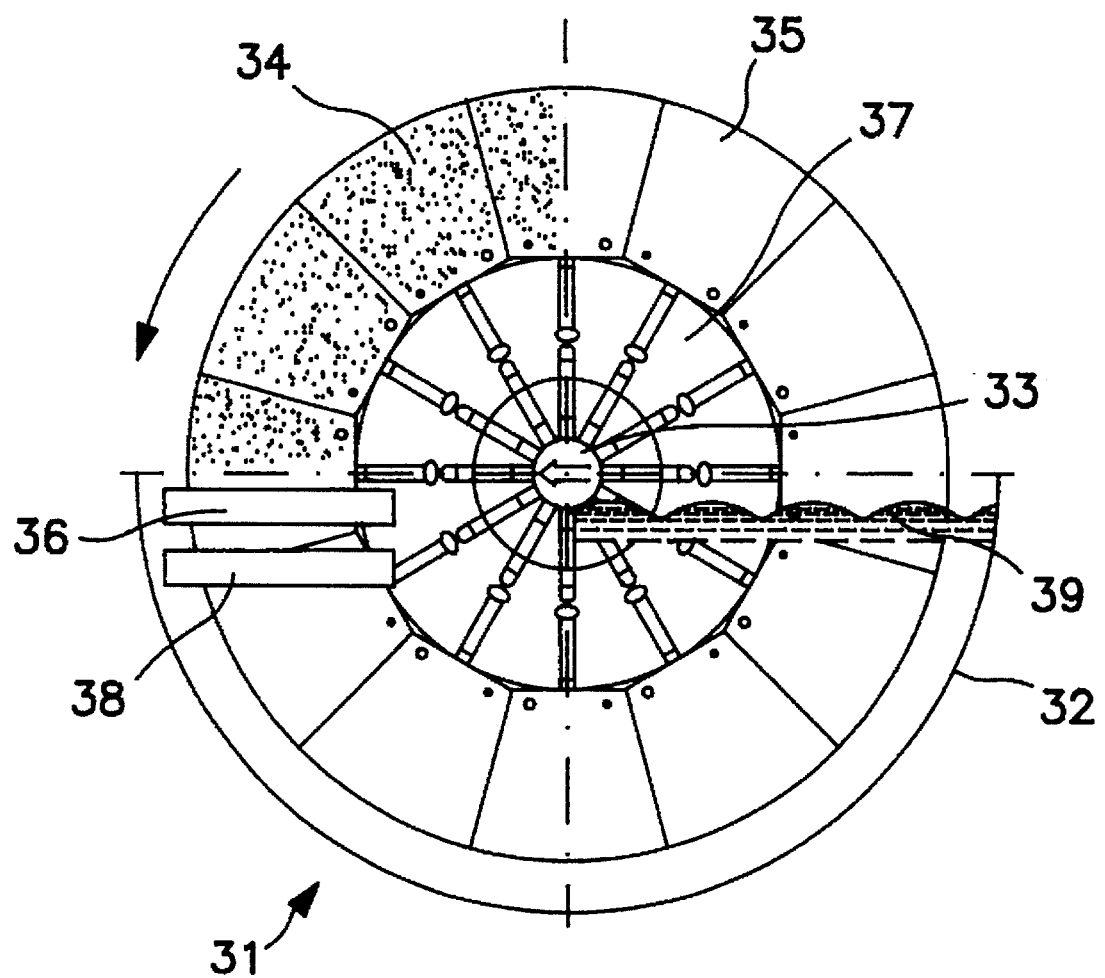
FIG. 4 is a schematic cross-section of the location of the ultrasonic oscillator of the invention in a suction dryer.

According to FIG. 4, the suction dryer 31 comprises a slurry tank 32, a disc 34 rotatable around the axis 33, to which disc the filter elements 35 of the filter medium are attached, and a scraper 36 for removing the filter cake formed on the filter surface 37 of the filter element. The ultrasonic oscillator or oscillators 38 for focusing the ultrasonic beams to the filter element 35 are according to the invention located underneath the slurry surface 39.

I claim:

1. A method for cleaning a filter medium of a suction dryer in substantially continuous operation by means of ultrasound comprising focusing ultrasonic beams emitted from at least one ultrasonic oscillator near or onto a filter surface of the filter medium by means of a convex oscillating surface formed in the ultrasonic oscillator and by means of a concave reflector surface provided separately from the ultrasonic oscillator in order to form at least one ultrasound focusing zone.

2. A method according to claim 1, wherein the focusing of ultrasonic beams onto the filter surface of the filter medium is carried out by means of ultrasonic oscillators located tangentially on the circumference a circle in their oscillating surfaces.

3. The method of claim 1, wherein the ultrasonic beams are focused onto the filter surface.

4. A method according to claim 3 wherein the focusing of ultrasonic beams onto the filter surface of the filter medium is carried out by means of ultrasonic oscillators located at different distances from the filter surface.

* * * * *